June 6, 1944.   H. J. SANG   2,350,419
TENSIOMETER
Filed May 26, 1942   2 Sheets-Sheet 1

INVENTOR:
Henry J. Sang,
BY Barr, Borden & Fox
ATTORNEYS.

June 6, 1944.   H. J. SANG   2,350,419
TENSIOMETER
Filed May 26, 1942   2 Sheets-Sheet 2

INVENTOR:
Henry J. Sang,
BY Barr, Borden & Fox
ATTORNEYS.

Patented June 6, 1944

2,350,419

UNITED STATES PATENT OFFICE 2,350,419

TENSIOMETER

Henry J. Sang, Moylan, Pa.

Application May 26, 1942, Serial No. 444,599

9 Claims. (Cl. 265—1.6)

This invention relates to tensiometers, and particularly to devices for measuring the tension in wires, cables, guy wires, stays, and the like.

There are many situations in the arts in which the exact tensioning of cables and the like is material to the safety of the device and its operators. Specifically, for instance, the control cables as well as rigging wires in aircraft need to be maintained in very exact predetermined tension for the utmost in safety. It is desirable that the instrumentality for securing such measurement be small and light in order to be insertable into and operable within small inspection openings, that the proper and efficient use of the instrument be by a movement of a single hand of the operator, that the recording of the exact tension be automatic and that the determination of the tension of the cable be exact regardless of the particular diameter or elasticity of the instant cable or the like being tested, designated as the "deflection characteristics," and that it be susceptible to use upon various sizes of wires or cables with maintained accuracy.

It is among the objects of this invention; to provide a tension meter possessed of all of the above described attributes; to produce an instrument for exact measurements of tension in contrast to the mere approximations of tension obtained with the prior art; to produce a portable instrument of extreme lightness and compactness without sacrifice of efficiency; to provide a tension meter which measures the tension of a cord or cable solely by the measurement of the deflection of an elastic member deflected by the tension of the cables, which obviates the potential variations in tension reading arising from friction about pivots and the like in other devices for similar purposes; to provide a novel device for measuring the tension of taut wires, cables and the like; to provide a tension meter by which the tension of various sizes of cables may be determined without resort to calibration tables or charts; to provide a tension meter by which a tension reading is obtainable with a single motion of the hand; to improve the art of tensiometers; to provide in a single instrument a device for testing tensions of cables having various determined deflecting characteristics; and many other objects and advantages will become more apparent as the description proceeds.

In carrying out the invention in a preferred embodiment an elastic deflection beam or the like is provided which is loaded by forcing it against a taut cable from a point spaced from the free end of the beam, with a calibrated agency operative to measure the deflection of the beam as a result of beam loading only without regard to friction in pivots and the like as a function of cable tension and which has substantially identical readings for identically tautened cables of similar characteristics regardless of known variations in diameters thereof.

In the accompanying drawings forming part of this description,

Figure 1:
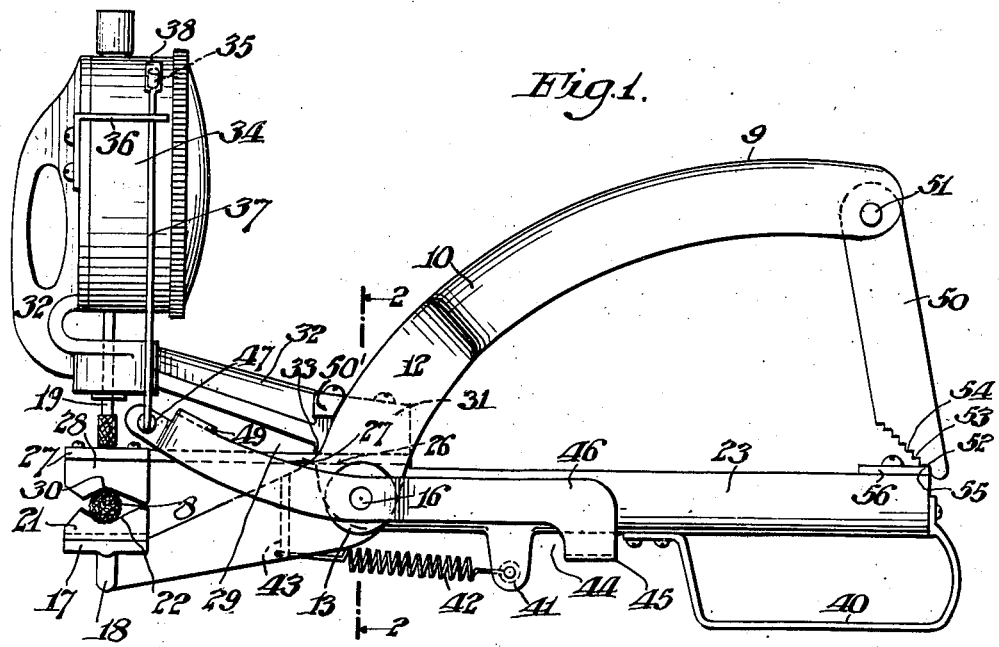
Fig. 1 represents a side elevation of the instrument according to a preferred embodiment thereof in engagement with a cable shown in section.
Figure 2:
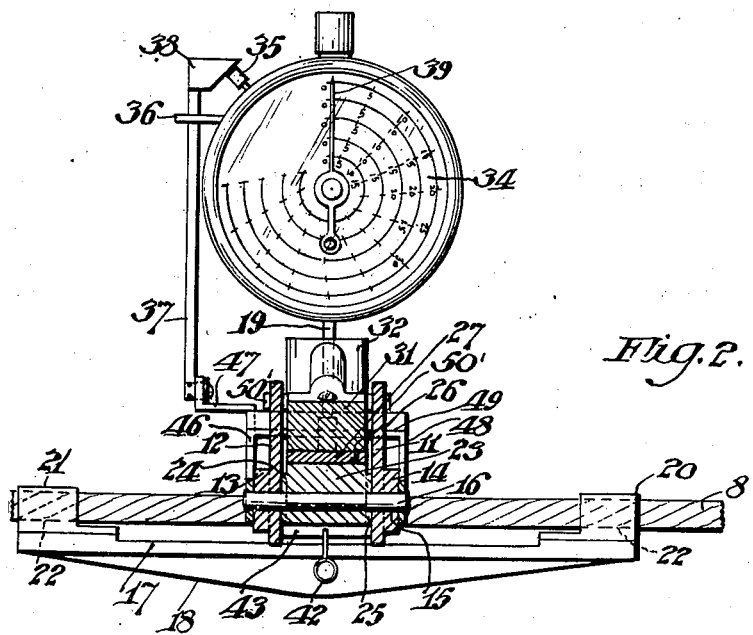
Fig. 2 represents a section on line 2—2 of Fig. 1.
Figure 3:
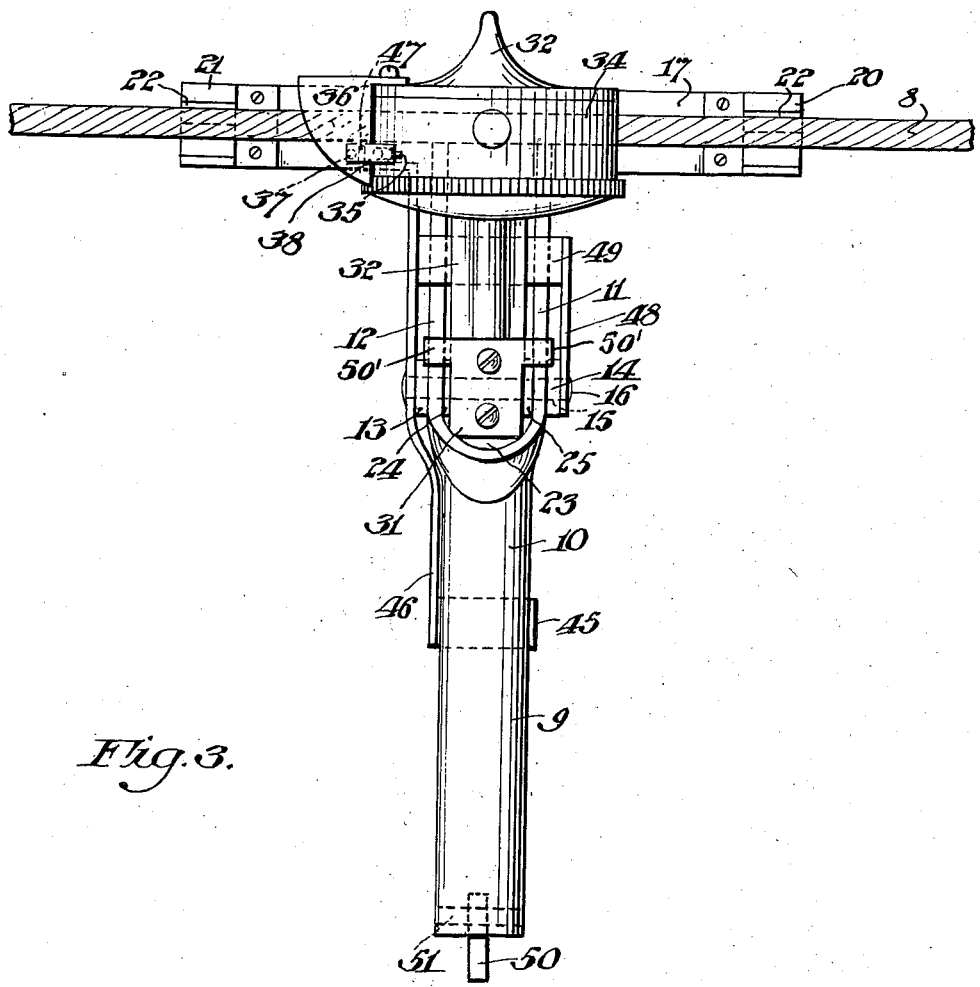
Fig. 3 represents a plan of the instrument of Fig. 1.

In the preferred embodiment there is provided an upper or primary lever or frame member 10 having a handle portion 9, and which is enlarged and effectively bifurcated or slotted in the substantial center, to form spaced side members 11 and 12. The latter are respectively provided on the outer surfaces with the integral bosses 13 and 14, suitably apertured as at 15, to form a pivotal bearing for the transverse axis pin 16, which extends through and on each side laterally beyond the bosses to receive the snubber or frictional-release-lever to be described. The lever 10 extends downwardly beyond the enlarged slotted central portion and merges integrally, preferably, into the lower jaw 17, which is suitably reinforced as by the integral web 18 on the lower surface transverse of the lever. The upper face of the lower jaw 17 carries at each end the spaced cable-receiving angularly grooved members 20 and 21, respectively, the grooves 22 of which face or present upwardly to receive and center cables of a wide range of sizes. An illustrative cable is indicated at 8. If desired, grooved rollers or the like may be substituted for the fixed guide members shown.

A lower or secondary lever or frame member 23 is provided, narrow enough to be insertable between the spaced lateral walls 11 and 12, of the upper or primary member or lever, and has lateral bosses 24 and 25, the outer faces of which are of such relative spacing as to fit slidably within the spaced walls 11 and 12 of the primary lever and the lever 23 and aligned bosses 24 and 25 are suitably apertured as to receive and pivot the lever upon the axis pin 16. The secondary lever 23 terminates at the front end just forwardly of the pivot 16, and has, above the pivot, a flat upper, preferably machined, surface 26, upon which the elastic deflection beam or bar 27 is mounted. This latter may be a beam, or a spring or other member and preferably comprises a cantilever element extending forwardly and carrying at its free end the downwardly presenting cable-engaging member 28, having the angular groove 30 in its lower face. The beam 27 and member 28 comprise the other or upper jaw of the instrument, opposed to jaw 17. The center of groove 30 of block 28 is aligned laterally with the centers of the grooves 22 of the complemental blocks 20 and 21, when the frames are swung on axis 16 so as to cause such alignment. The beam or cantilever member 27 is clamped at its inner anchored end to the frame or lever 23 by the inner anchored end 31 of the goose-neck arm 32 for the recording indicator 34 to be described. Arm 32 overlying the beam, is cut away underneath as at 29, to permit the beam to flex, and the cut away portion terminates in a shoulder 33, marking the forward end of the terminal 31 of the goose-neck in its contact with and overlying the beam 27, which may be angular or rounded, to define an effective fulcrum about which the beam deflects, as will be clear. The outer or free end of the goose neck 32, rigidly carries the dial instrument or indicator 34, preferably having a spring-loaded centrally pivoted movable pointer 39 controlled by the generally vertical load-receiving plunger 19. Obviously, any sort of indicator may be used and it may be disposed in any position so long as it is so located as to be actuated as a result of flexing of the beam and movement of the free end thereof. The indicator is so mounted that the plunger end is arranged to abut and to ride upon the free end of the cantilever beam 27 with which it has a zero setting of contact when the beam is unstressed and unflexed. Any flexing upwardly actuates the plunger. The pointer 39 is moved about the center of the dial in response to upward motions of the plunger, sliding freely through the appropriately spaced or apertured portion of the goose-neck support 32.

Figure 4:
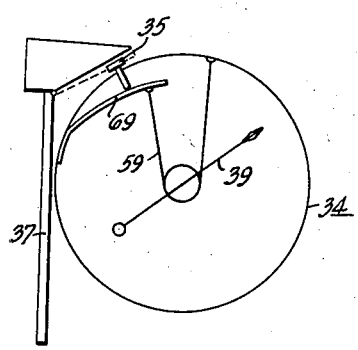
Fig. 4 represents a diagrammatic elevation of the operative portions of the dial and snubber assembly in operative association with a fragment of the friction release plunger.

Although it is contemplated that in certain instances sufficient accuracy may be achieved by a double pointer indicator, comprising a master pointer and a dragged pointer, the latter of which remains at the position to which it is moved by the master pointer in response to a beam deflection and subsequent release of deflection and zero resetting of the master pointer, the friction involved is substantial and frequently inconstant and may materially affect the readings. It is preferred to use a dial pointer which moves angularly in response to load and which is selectively either free or under the controlled restraint of a snubber or imposed friction such as flexible brake cord or the like 59, which latter, in one form of indicator as shown in Fig. 4, is normally resiliently effective by spring 69 upon the pointer 39 to retain it in its adjusted position. This serves as a recorder of the established tension reading, and the snubber is arranged to be released or thrown out of action by inward radial motion of the small spring-pressed plunger 35. Upon the inward movement thereof, radially of the housing of the instrument, the frictional snub or drag is removed. It is important in securing exact readings that the out-motion of the indicator, in response to the imposition of a load by which the beam is deflected, be free of the frictional restraint of the snubber, and this is secured and controlled by plunger 35 deflecting spring 69 and thus relieving friction cable 59. To this end a bracket arm 36 is mounted on the housing of the register, having a guide hole in general or substantial alignment with the plunger 35, within which a rod 37 is slidably guidable, and the latter has a downwardly presenting cam 38, having a sloping or inclined face in engagement with the end of plunger 35, in position to force it radially inwardly of the housing when the rod 37 is forced downwardly. To facilitate this action, the lower or secondary lever or frame 23 has a gripping piece 40 upon which all but one of the operator's fingers of one hand are disposed in gripping, manipulating and actuating the tool. The front end of the gripping piece terminates in rearwardly spaced relation to an apertured lug or ear 41, integral with the lower lever. Lug 41 anchors the rear end of a tension-spring 42, anchored at the front to an apertured web 43 of the lower end of the upper lever, to urge the jaws apart, until stops 50' on terminal 31 of gooseneck 32 engage the respective lugs or arms 11 and 12, as will be clear. In the space 44 between gripping piece 40 and lug 41, there is provided the transverse finger element 45, merging at one side of lever 23 into the forwardly extending lever 46, having an aperture and being pivotally mounted on one end of the axis pin 16, outside of the boss 14, and terminating in the forward and laterally extending end 47, bent from arm 46 so as to be substantially aligned with the lower end of the rod 37, which it pivotally engages. To strengthen the friction release lever 46 in its pivotal relation, it is preferred to provide a forward cross-element or member 49 leading to a rearwardly extending arm 48 pivotally mounted on the other end of axis pin 16 adjacent to the external boss 13 of the upper lever.

An important attribute of this invention lies in its adaptability to proper and correct use with various diameters or conditions of cable, called herein "deflection characteristics." This is expeditiously effected by providing preferably toward or at the rear ends of the respective levers, and preferably, although not essentially, on the opposite side of the pivot from the jaw, an adjustable stop, which may comprise a cam, screw, wedge or the like. Illustratively only, it may comprise a cam device 50 which is pivoted to or on one lever with a variable degree of friction, as at 51, and has an operative face or edge provided for instance with angular notches, illustratively respectively 52, 53 and 54 etc., for instance, arranged selectively according to the setting of the cam and the lever to abut and be stopped upon the shoulder 55 of a block 56 on the other lever, such as lever 23. Obviously, the cam may be mounted on either lever and at any position thereon. The cam piece in the illustrative form is swung further toward the rear to enable the upper notches to engage the stop, and is swung forwardly to engage the lower notches or other stop setting with the stop. The notches are so located and proportioned to the diameter and elasticity of the cable being engaged (its deflection characteristics) that the deflection of the beam during operation of the instrument due to the tension of the given cable is substantially the same as for cables of other diameters but of the same characteristics and loaded to the same degree. Thus, with one size of cable excess manual pressure on the levers operative on the cable, cannot change the reading of the true tension, as all such excess pressure is absorbed by the stop.

It is important to note that the calibration of the instrument or indicator may be in pounds, or in symbols such that reference may be made to a chart, to ascertain the meaning of the reading, if this is desired.

In operation, the operator knowing the size of cable under test, makes the proper adjustment of the cam element or adjustable stop to create a positive stop and limit to the relative handle movement, then he grasps the upper and lower levers in one hand, with his forefinger in engagement with the finger piece 45, which is then first moved to swing the friction release-lever on pivot 16, to pull down on rod 37, to disengage the snubber or friction from indicator pointer 39. While maintaining such compression on the end 45 of the lever 46, he grips the cable between the relatively approaching and closing jaws and squeezes the jaws upon the stressed cable until the stop prevents further relative lever motion in accordance with the deflection characteristics of the cable and the preselection of the stop. At the moment of maximum lever pressure, he releases the snubber friction by releasing the forefinger pressure upon the finger piece 43 of arm 46, which causes the spring-pressed release handle 35 to spring outwardly in its housing.

The relative closing movements of the jaws will be resisted by tension in the cable and the loading of the elastic beam 27 will begin. Attainment of the maximum pressure on the cable permitted by the adjustable stop will cause a maximum loading and deflection of the cantilever beam which will be indicated by the movement of the indicator plunger and indicator pointer coupled thereto.

The snubber then frictionally holds the pointer 39 in its maximum attained position against its resilient urge to return to zero. Then the operator releases the pressure on the lever handles and the handles are pushed apart by the spring 42. The snubber will have anchored the indicator at the point of maximum deflection, and the actual tension on the given cable will be known by reading the indicator 34 as determined by the position of pointer 39.

It will be understood that the measurement is not that degree of pressure necessary to move the handles of the levers to the adjusted position, because this would involve the consideration of the friction of the pivot of the device. The measurement is the deflection established in the beam 27, and this is independent of the friction of the pivot of the device as will be clear. It will be understood that the indicator may be a dial gauge, as shown, or a scale and pointer or other type of indicator.

Having thus described my invention, I claim:

1. A tension meter comprising a lever, a pair of relatively spaced cable-contacting members mounted rigidly on one end of the lever, a second lever pivoted to the first lever and carrying a plunger operated indicator, a plunger extending from the indicator toward a line extending between the members, an elastic element mounted rigidly at one end to the second lever and extending under the plunger, a cable-contacting element mounted on the elastic member and presenting toward and located between the first mentioned spaced members, the relative movement of the levers on their pivot causing the respective members to engage a cable and thus to deflect the elastic element, the plunger being moved relative to the indicator to actuate same to measure the deflection of the element and thus the tension of such cable, a snubber friction device on said indicator, means including a finger-piece juxtaposed to the first mentioned lever and operative independently of compression of the levers to release the snubbing friction device during test compressions and to re-engage the friction device before the compression is released so as to retain a secured reading, said device including a substantially radially movable spring pressed plunger, said last mentioned means comprising a rod having a cam face superposed on said plunger and a supplemental lever pivoted to the first mentioned lever and pivoted to said rod so that the movement of the supplemental lever in one direction depresses the plunger of the device.

2. A tension meter comprising a lever, a pair of relatively spaced cable-contacting members mounted rigidly on one end of the lever, a second lever pivoted to the first lever and carrying a plunger operated indicator, a plunger extending from the indicator toward a line extending between the members, an elastic element mounted rigidly at one end to the second lever and extending under the plunger, a cable contacting element mounted on the elastic member and presenting toward and located between the first mentioned spaced members, the relative movement of the levers on their pivot causing the respective members to engage a cable and thus to deflect the elastic element, the plunger being moved relative to the indicator to actuate same to measure the deflection of the element and thus the tension of such cable, a snubber friction device on said indicator, means including a finger-piece juxtaposed to the first mentioned lever and operative independently of compression of the levers to release the snubbing friction device during test compressions and to re-engage the friction device before the compression is released so as to retain a secured reading.

3. A tension meter comprising a pair of relatively movable cable engaging elements, one element comprising spaced cable contact devices and the other element comprising a deflection beam having a free end, means on the free end of the beam for engaging a cable to be tested, means for urging the elements together effective on the beam at a point spaced from the free end thereof to cause the deflection of the beam relative to such point as a function of tension in such cable, means including a movable indicator for measuring the deflection of the beam as a measure of tension in such cable, means for proportioning the deflection potentialities of the beam to the diameter of the cable to be tested, said means being so close to the free ends of the levers that gripping pressure on the levers is generally located between said means and said pivot, said means comprising a movable cam element having notches on its face mounted for restrained movement on one lever and a notch engaging element on the other of said levers in position to be abutted by a selected notch predetermined for deflection characteristics of a given wire or cable, a friction drag snubber operatively associated in manually controlled selective engagement or disengagement with the indicator, means for disengaging the snubber during deflection measuring movement of the indicator to avoid inaccuracies of readings due to friction, and means engaging the snubber and indicator to temporarily maintain the indicator at the established reading after release of the cable.

4. A tension meter comprising a pair of relatively movable cable engaging elements, a plunger operated indicator mounted on one of the elements, one element comprising spaced cable contact devices and the other element comprising a deflection beam having a free end, means on the free end of the beam for engaging a cable to be tested, means for urging the elements together effective on the beam at a point spaced from the free end thereof to cause the deflection of the beam relative to such point as a function of tension in such cable, means constantly mounted on the tensiometer during adjustments for proportioning the deflection potentialities of the beam to the deflection characteristics of the cable to be tested, said means being so close to the free ends of the levers that gripping pressure on the levers is generally located between said means and said pivot, a friction drag snubber operatively associated in manually controlled selective engagement or disengagement with the indicator, means for disengaging the snubber during deflection measuring movement of the indicator to avoid inaccuracies of readings due to friction, and means engaging the snubber and indicator to temporarily maintain the indicator at the established reading after release of the cable.

5. A tension meter comprising a lever, a pair of relative spaced cable-contacting members mounted rigidly on one end of the lever, a second lever pivoted to the first lever, a plunger operated indicator mounted on the second lever, a plunger extending from the indicator toward a line extending between the members, an elastic element mounted rigidly at one end to the second lever and extending under the plunger, a cable contacting element mounted on the elastic member and presenting toward and located between the first mentioned spaced members, the relative movement of the levers on their pivot causing the respective members to engage a cable and thus to deflect the elastic element, the plunger being moved relative to the indicator to actuate same to measure the deflection of the element and thus the tension of such cable, means constantly mounted on the tensiometer during adjustments operative to impose predetermined variable limits on the relative motions of the levers to cause the reading of the indicator to be accurate for various predetermined deflection characteristics of cable, a friction drag snubber operatively associated in manually controlled selective engagement or disengagement with the indicator, means for disengaging the snubber during deflection measuring movement of the indicator to avoid inaccuracies of readings due to friction, and means engaging the snubber and indicator to temporarily maintain the indicator at the established reading after release of the cable.

6. A tension meter comprising a pair of relatively movable cable engaging elements, one element comprising spaced cable contact devices and the other element comprising a deflection beam having a free end, means on the free end of the beam for engaging a cable to be tested, means for urging the elements together effective on the beam at a point spaced from the free end thereof to cause the deflection of the beam relative to such point as a function of tension in such cable, means including a movable indicator for measuring the deflection of the beam as a measure of tension of such cable, means constantly mounted on the tensiometer during adjustments for proportioning the deflection potentialities of the beam to the deflection characteristics of the cable to be tested, a friction drag snubber operatively associated in manually controlled selective engagement or disengagement with the indicator, means for disengaging the snubber during deflection measuring movement of the indicator to avoid inaccuracies of readings due to friction, and means engaging the snubber and indicator to temporarily maintain the indicator at the established reading after release of the cable.

7. A tension meter comprising a lever, a pair of relatively spaced cable-contacting members mounted rigidly on one end of the lever, a second lever pivoted to the first lever, a plunger operated indicator mounted on the second lever, a plunger extending from the indicator toward a line extending between the members, an elastic element mounted rigidly at one end to the second lever and extending under the plunger, a cable contacting element mounted on the elastic member and presenting toward and located between the first mentioned spaced members, the relative movement of the levers on their pivot causing the respective members to engage a cable and thus to deflect the elastic element, the plunger being moved relative to the indicator to actuate same to measure the deflection of the element and thus the tension of such cable, a friction drag snubber operatively associated in manually controlled selective engagement or disengagement with the indicator, means for disengaging the snubber during deflection measuring movement of the indicator to avoid inaccuracies of readings due to friction, and means engaging the snubber and indicator to temporarily maintain the indicator at the established reading after release of the cable.

8. A tension meter comprising a pair of pivoted levers forming a pair of plier jaws, one of the plier jaws comprising a pair of spaced cable-receiving elements, and the other plier jaw comprising a cantilever member including a cable receiving element comprising an extension of a lever, arranged to deflect under pressure from the pivoted levers when the cable-receiving elements are in pressing contact against a taut cable, means including a movable indicator for measuring the deflection of the cantilever member as a function of tension in the cable, a friction drag snubber operatively associated in manually controlled selective engagement or disengagement with the indicator, means for disengaging the snubber during deflection measuring movement of the indicator to avoid inaccuracies of readings due to friction, and means engaging the snubber and indicator to temporarily maintain the indicator at the established reading after release of the cable.

9. A tension meter comprising a pair of relatively movable cable engaging elements, one element comprising spaced cable contact devices and the other element comprising a deflection beam having a free end, means on the free end of the beam for engaging a cable to be tested, means for urging the elements together effective on the beam at a point spaced from the free end thereof to cause the deflection of the beam relative to such point as a function of tension in such cable, means including a movable indicator for measuring the deflection of the beam as a measure of tension of such cable, a friction drag snubber operatively associated in manually controlled selective engagement or disengagement with the indicator, means for disengaging the snubber during deflection measuring movement of the indicator to avoid inaccuracies of readings due to friction, and means engaging the snubber and indicator to temporarily maintain the indicator at the established reading after release of the cable.

HENRY J. SANG.